UNITED STATES PATENT OFFICE.

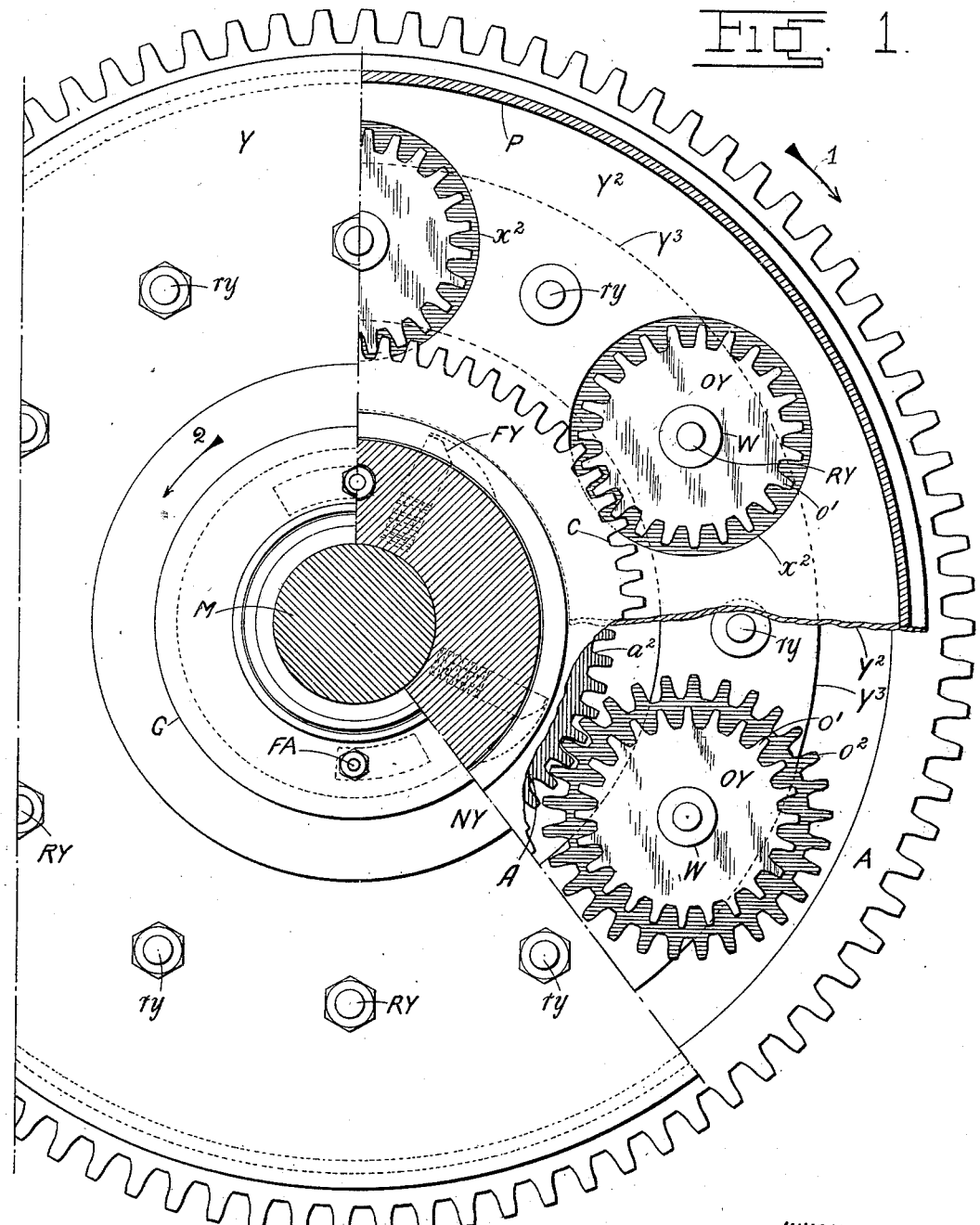

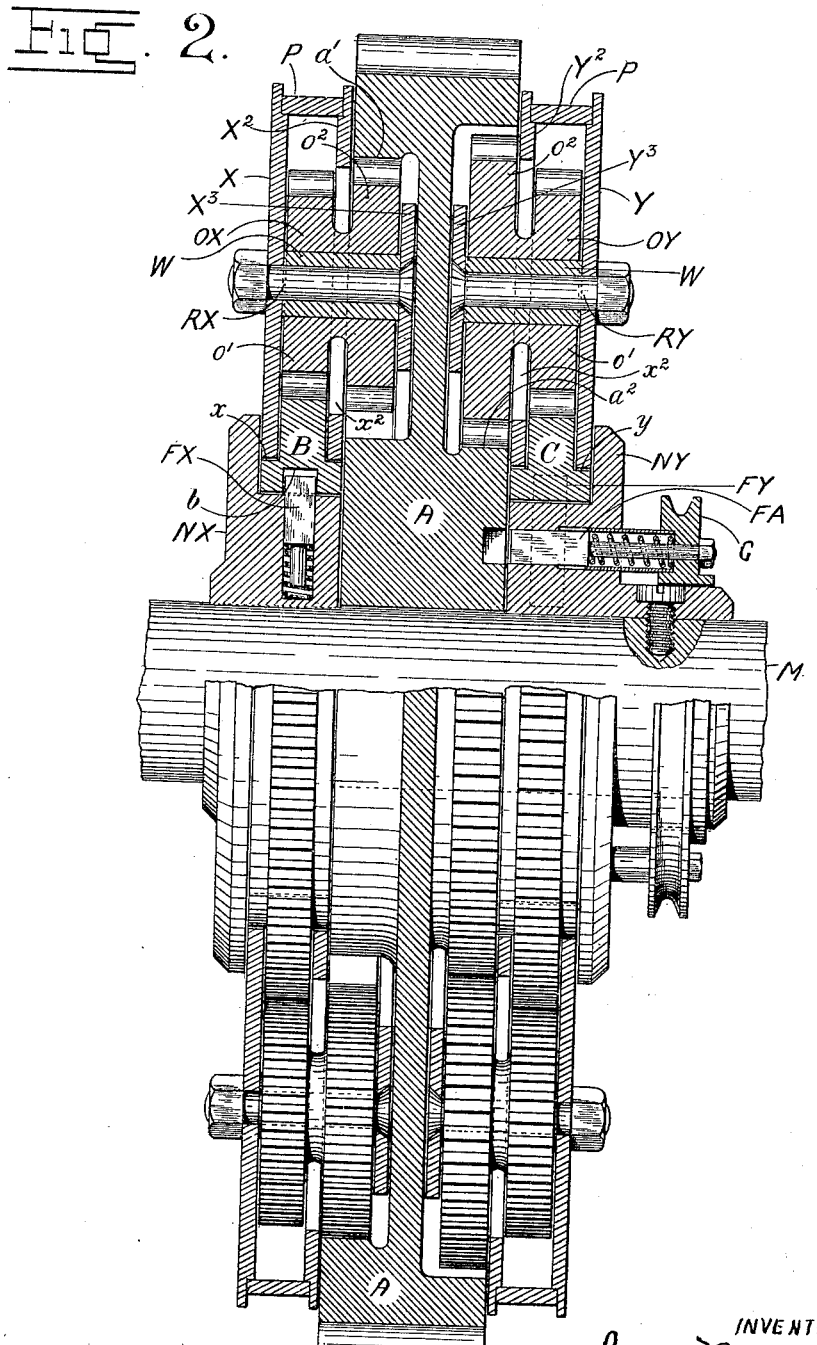

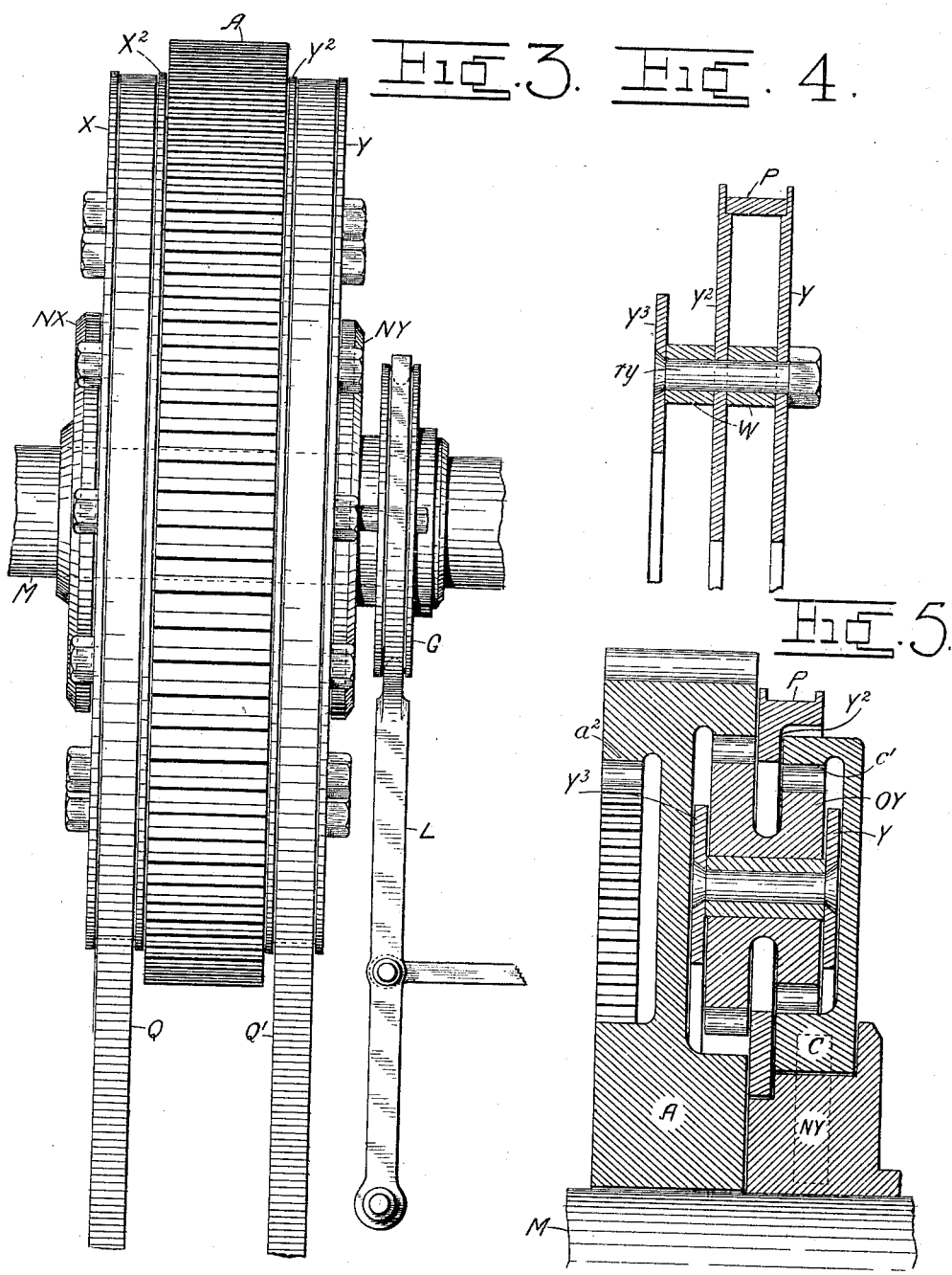

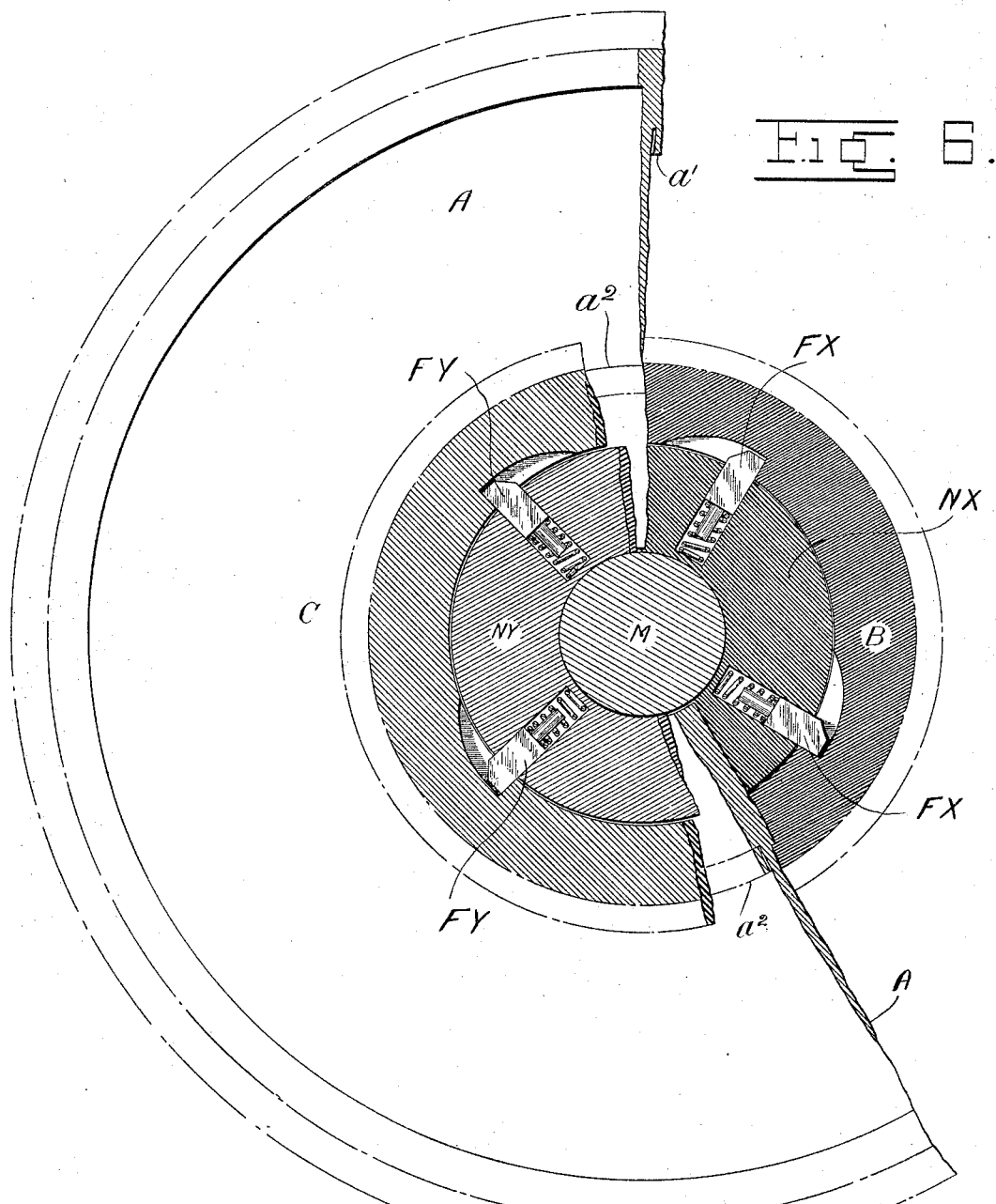

JAMES RUSSELL MADAN, OF SALISBURY, ENGLAND.

VARIABLE-SPEED GEAR FOR MOTOR VEHICLES, CYLES, OR THE LIKE.

SPECIFICATION forming part of Letters Patent No. 697,153, dated April 8, 1902.

Original application filed July 14, 1900. Serial No. 23,612. Divided and this application filed March 15, 1901. Serial No. 51,283. (No model.)

*To all whom it may concern:*

Be it known that I, JAMES RUSSELL MADAN, a subject of the King of Great Britain and Ireland, and a resident of Downton, Salisbury, in the county of Wilts, England, have invented certain new and useful Improvements in Variable-Speed Gear for Motor Vehicles, Cycles, or the Like, (for which I have made application for patent in Great Britain, dated May 5, 1900; in France, dated September 15, 1900; in Belgium, dated September 15, 1900, and in Germany, dated September 18, 1900,) of which the following is a specification.

This case is a division of an earlier application filed by me July 14, 1900, and serially numbered 23,612.

My invention relates to variable-speed gear of the kind described in my prior patent application, filed July 14, 1900, Serial No. 23,612, and adapted for motor cars, cycles, and the like.

It is the object of the present invention to provide a compact and simple variable-speed gear of the free-wheel type adapted to give two or three different speeds and a reversing motion by the simple locking or unlocking of one or more parts. The toothed wheels of the gear will always be in engagement, so as to avoid shocks and strains when the gear is changed.

I will describe my invention in reference to the accompanying drawings, which show the gear as designed for a motor-car.

Figure 1 is a part side elevation with parts broken away to show the internal arrangements. Fig. 2 is a section of Fig. 1 with part of the gear-wheels shown in full. Fig. 3 is a plan of the gear at a smaller scale, and Figs. 4 and 5 are details. Fig. 6 is a sectional view illustrating the one-way clutches.

NX and NY are two collars or sleeves fixed to the hub or axle M and supporting two toothed rings B and C, one on either side of a toothed wheel A, mounted free upon the axle M between the collars NX and NY. The toothed ring B is connected to the collar NX, so as to drive the axle M in one direction only, by a clutch or free-wheel mechanism of suitable kind, such as spring-pressed bolts or teeth FX in the collar NX, engaging recesses $b$ in the ring B. The toothed ring C is connected, so as to drive the collar NY, by clutch FY in a similar manner to the ring B, but is arranged to drive in the opposite direction. The side face of the boss of the gear-wheel A is also connected to the collar NY by horizontally - disposed clutches FA, adapted to drive in the same direction as ring C, but opposite to the ring B, and these clutches FA are so connected to a horizontally-sliding collar G that by sliding said collar toward or back from the gear on the sleeve NY the clutches FA may be put into or out of position for engagement with the wheel A. The wheel A will be entirely free in both directions when the collar is moved outward. Two side plates X and Y are also provided adapted to run free on ball or other bearings $x$ and $y$, respectively, upon the collars NX NY or the rings B and C, referred to, and these plates X and Y carry fixed studs RX and RY, acting as axles for two series of rotating double spur-wheels OX and OY. The outer halves $o'$ of the double spur-wheels on each side gear with the rings B and C, while the inner halves $o^2$ gear with internally-toothed rim $a'$ and externally-toothed rim $a^2$ upon the driven spur-wheel A.

$X^2$ $X^3$ $Y^2$ $Y^3$ are annular side plates serving as supports for the axles RX RY and being secured to the side plates X and Y by intermediate bolts $ry$. The intermediate plates $X^2$ $Y^2$ are provided with apertures $x^2$ where the double spur-wheels are situated, while the inner plates $X^3$ $Y^3$ receive the ends of axles RX RY, which are countersunk therein. The outer ends of the axles are passed through the side plates X and Y and secured by nuts, as shown. The axles RX RY carry distancing-sleeves W. In the case of the axles RX RY the distancing-sleeve W will be continuous, while the sleeves upon the intermediate bolts $ry$ will be divided to receive and secure the intermediate plates $X^2$ $Y^2$, as shown in Fig. 4. The peripheries of the plates X and $X^2$ and Y and $Y^2$ are connected by plates or flanges P P, suitably recessed to form grooves adaped to receive band-brakes Q Q' for locking the side plates against movement, or, equivalently, the parts may be provided with ratchet-teeth adapted to be engaged by suitably-arranged pawls for the same purpose.

In a gear constructed and arranged as above the operation is as follows: Assuming the wheel A to be driven by the motor in the direction of the arrow 1, by sliding the collar G outward by means of the connecting-lever L (see Fig. 3) the clutch-bolts FA are withdrawn and the engine disconnected. The gear-wheel A being entirely free, no power is communicated to the axle M. If the collar G is slid inward, the clutch-bolt FA comes into action and the gear-wheel A drives the axle M at its normal speed. If the collar G is slid outward, so as to withdraw the clutch-bolts FA from action, and the side plate Y is locked by means of the brake Q' or other locking-catch upon part P, then the double spur-wheels OY come into action, the power being communicated from wheel A by externally-toothed rim $a^2$ to the inner half $o^2$ of the double spur-wheel OY and by the other half $o'$ thereof to the toothed ring C by the clutch mechanism FY and collar NY to the axle M, the axle being driven at a lower speed or higher speed than A, according to the relative dimensions of the inner and outer halves of the double spur-wheels. It will not be necessary to withdraw the clutch-bolts FA where the double spur-wheels OY are arranged to increase the speed, as in this case the clutch-bolts FA will overrun the wheel A. For obtaining a reversed motion of the axles the clutch-bolts FA are withdrawn and the side plate X is locked. Then the power is transmitted by the internally-toothed rim $a'$ to the double spur-wheels OX and thence by the ring B and clutch FX to the axle M in the direction of the arrow 2. This reversed motion is obtained by the arrangement of the externally-toothed rim $a^2$ on one side of the wheel A and the internally-toothed rim $a'$ on the other side, the clutches FY and FX being, as before mentioned, oppositely arranged.

The lever L for operating the collar G and the brake-bands Q Q', bolts, or catches for locking the side plates or their parts P may be arranged for operation by suitable connecting-levers, wires, or rods from a conveniently-disposed handle, and in some cases they may be spring-operated.

Fig. 5 shows a modified construction of the gear, wherein the side ring C is carried up around the double spur-wheels OY and gears with the same by means of an internally-toothed rim $c'$. The inner half of the double spur-wheel OY also gears with the gear-wheel A by an internally-toothed rim $a^2$. The side plates Y $Y^2$ $Y^3$ will be appropriately arranged, the central plate $Y^2$ being formed, as at P, to receive the locking brake-bands, as before. The action of this gear will be exactly similar to that hereinbefore described with the exception that the arrangement of internally-toothed rims will afford greater strength in use.

Speed-gears constructed as above described are compact, light, and simple and are adapted for alteration by the simple operations described to two speeds—driving or a reversing motion—and whatever gear may be in use the free-wheel mechanism is always available, so that if the engine is stopped no strain is set up therein by the continued movement of the car-axle.

The improved speed-gear can be readily fitted to existing cars, and if combined with a three-speed gear, as described in my prior patent application referred to, six speeds forward and three reversing may be obtained, so that very slight rises in speed can be provided for, thus avoiding great strain on the wheels and mechanism of the car.

Having now described my invention, what I claim as new, and desire to secure by Letters Patent, is—

1. The improved variable-speed and reversing gear comprising the combination with the axle of two toothed rings, oppositely-acting one-direction clutch mechanisms, connecting said rings and axle, a gear-wheel disposed between the toothed rings, one-direction clutch mechanism between said gear-wheel and axle, a set of independent double spur-wheels on one side of the gear-wheel gearing with the said toothed ring on that side and an internally-toothed rim on the gear-wheel and another set of independent double spur-wheels on the other side of the gear-wheel gearing with the toothed ring on that side and an externally-toothed rim on the gear-wheel and means for entirely disengaging the clutch between the main gear-wheel and the axle, all substantially as set forth.

2. The improved variable-speed gear comprising the combination with an axle of a gear-wheel, two collars fixed to the axle on either side of said gear-wheel, one-direction clutch mechanism between said gear-wheel and one of the collars, means for withdrawing the clutch between the collar and gear-wheel so as to allow the latter to run free in both directions, a toothed rim on one side of the gear-wheel and a toothed rim on the other side of the gear-wheel, two sets of double spur-wheels, one on each side of said gear-wheel, the inner halves gearing respectively with the said toothed rims thereon, toothed rings disposed upon the fixed collars at each side of the gear-wheel and gearing with the outer halves of the said double spur-wheels suitable one-direction clutch mechanism between each toothed ring and its collar, the clutch mechanism on one side driving in the opposite direction to that on the other, and means for holding and releasing the side plates which carry the double spur-wheels when it is required to vary the gear all substantially as and for the purposes set forth.

3. The improved variable-speed gear comprising the combination with shaft M, collars NX and NY, toothed rings B and C and gear-wheel A having toothed rims $a'$ $a^2$ of double spur-wheels OX OY, axles RX RY respectively for said double spur-wheels, plates respectively $X'$ $X^8$ and $Y^7$ $Y^3$, supporting said axles RX RY, intermediate plates $X^2 Y^2$ having apertures $x^2$, studs $ry$ connecting plates $X'$ $X^2$ $X^3$ and $Y'$ $Y^2$ $Y^3$ between the double spur-wheels, the band-brake plates supported by said plates $X'$ $X^2$ and $Y'$ $Y^2$ and the brake-bands engaging said brake-band plates for locking and unlocking same, all substantially as set forth.

In witness whereof I have hereunto signed my name in the presence of two subscribing witnesses.

JAMES RUSSELL MADAN.

Witnesses:
REGINALD EATON ELLIS,
HENRY A. PRYOR.